Figure 1:
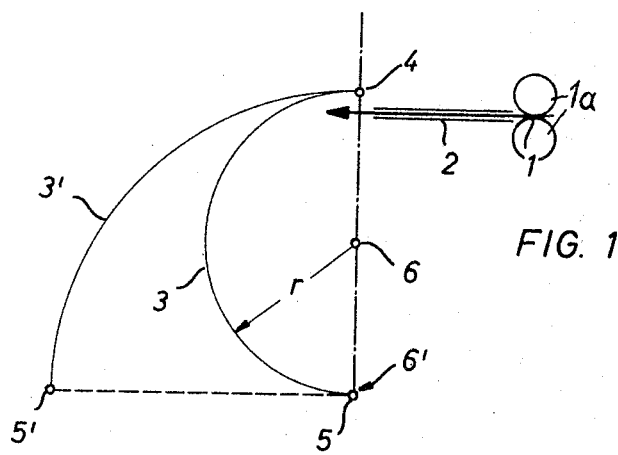

May 23, 1967 V. ECKHARDT 3,320,787
APPARATUS FOR PRODUCING HELICAL SEAM PIPES
Filed Nov. 4, 1963

INVENTOR
VILEM ECKHARDT
BY Dicke + Craig
ATTORNEYS

United States Patent Office 3,320,787
Patented May 23, 1967

3,320,787
APPARATUS FOR PRODUCING HELICAL
SEAM PIPES
Vilem Eckhardt, 7 Rue l'Arcade, Paris, France
Filed Nov. 4, 1963, Ser. No. 321,082
Claims priority, application Germany, Nov. 7, 1962,
E 23,815
4 Claims. (Cl. 72—135)

The present invention relates to improvements in an apparatus of a known type for producing welded helical seam pipes which consists of a forming tool which has a concave surface, the position of which may be varied relative to the direction in which a strip of material is to be fed toward this tool by means of feed rollers which pass the strip through a guide channel and then press it against the concave surface of the forming tool and thereby bend the strip continuously into a helical shape, the adjacent spires of which are then welded together to form a pipe. In one apparatus of this type as disclosed in my prior U.S. Patent No. 2,991,740 this forming tool consists of a rigid half shell which only permits pipes of relatively small differences in diameter to be produced. Such a forming tool with a fixed radius of curvature of its concave surface may be used, for example, for producing pipes of diameters of 18 to 20 inches. If pipes of smaller or larger diameters are to be produced, the forming tool must be replaced by one of another size.

In order to overcome this disadvantage of such a rigid forming tool in the shape of a half shell I have already proposed to employ instead a resilient steel plate which may be bent to different extents so as to vary the radius of curvature of its inner surface. Such a single resilient forming tool may therefore be used for producing pipes of much greater differences in diameter than could previously be produced by means of the rigid forming tool, for example, pipes which may vary between 16 and 24 inches. It is, however, not possible to use this same resilient forming tool for producing still larger or smaller pipes since the length of the resilient plate, that is, the distance between the parallel edges thereof which extend transverse to the feeding direction of the strip, determines the diameter of the largest pipe which may be produced with the same plate. Furthermore, one end portion of this resilient plate must be plane in order to permit it to be acted upon in a vertical direction by a ram which, when being moved in the direction toward the other end of the plate, varies the radius of curvature of the plate. The extent to which this radius may be reduced is limited by the elastic deformability of the plate.

It is an object of the present invention to improve the apparatus of the last-mentioned type so as to overcome the disadvantages of these apparatus as well as of those as disclosed in my earlier U.S. patent referred to above. For attaining this object, the invention provides that the forming tool consists of a resilient plate of a concave curvature which may be elastically deformed so that the sector angle thereof as defined by the inlet and outlet edges of the tool decreases when the radius of curvature increases. Therefore, contrary to the known plate-shaped forming tool, the diameter of the smallest pipe which can now be produced is determined by the length of the resilient plate, and accordingly the same plate may now also be used for producing pipes of a much larger diameter than could previously be produced, and without requiring a part of the plate to be deformed from its curved shape back to a plane shape.

According to the invention it is advisable to mount the plate-shaped forming tool in such a manner that the inlet edge thereof which is located adjacent to the point of entry of the strip which is to be molded into a helical shape is held in a fixed position, while by the provision of suitable adjusting means the opposite or outlet edge of the plate extending parallel to the inlet edge may be adjusted in the general direction in which the strip is fed toward the forming tool and may then be secured in the particular adjusted position. From this description of the plate-shaped forming tool it is evident that it must be made of a material of a high elasticity.

The features and advantages of the present invention will become more clearly apparent from the following detailed description of three preferred embodiments thereof which are illustrated diagrammatically in the accompanying drawings, in which—

Figure 2:
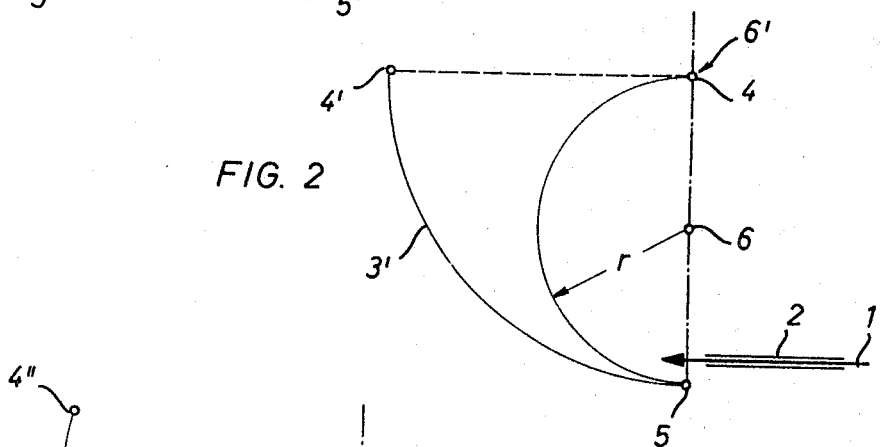
Figure 3:
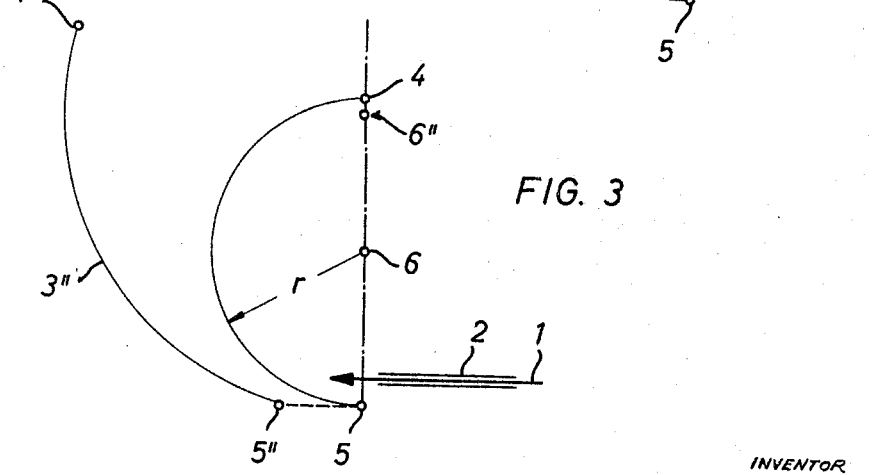

FIGURE 1 shows a side view of the plate-shaped forming tool in two different positions, in which the strip material to be molded into a helical shape is fed in the direction from the top toward the bottom of the tool and in which the sector angle of the concavely bent plate amounts in one position to 180° and in the other position to 90°;

FIGURE 2 shows a side view of the plate-shaped forming tool likewise in two positions, in which the strip material is fed from the bottom toward the top of the tool and in which the sector angle of the concavely bent plate likewise amounts in one position to 180° and in the other position to 90°; while FIGURE 3 shows a side view of the plate-shaped forming tool, likewise in two positions, in which the strip material is fed like in FIGURE 2 from the bottom toward the top of the tool and in which the sector angles of the concavely bent plate in the two positions also amount to 180° and 90°, respectively, but in which in the second position, the inlet edge of the plate is shifted to a point which is located at a greater distance from the end of the guide channel than in the embodiment according to FIGURE 2.

In the drawings, it is assumed in FIGURE 1 that a strip 1 which is to be molded into a helical shape is fed by feed rollers 1a through a guide channel 2 to a forming tool which consists of an elastically deformable plate 3, the two outer edges 4 and 5 of which lie within the same vertical plane which also contains the axis 6 of a cylinder which has a radius $r$ and one half of the peripheral area of which is covered by the plate 3. This radius $r$ therefore corresponds to the radius of curvature of plate 3. This half-shell shape of the forming tool is that shape which permits a pipe of a certain minimum diameter to be produced. Similarly as in the known forming tools as previously described, the radius of curvature $r$ of the inner wall surface of plate 3 is made larger than the radius of curvature of the outer surface of a pipe which may be produced with this tool.

If a pipe of a larger radius of curvature or diameter is to be produced, at least the edge 5 of plate 3 is shifted out of the mentioned vertical plane in the direction behind this plane, as seen in the feeding direction of strip 1 toward plate 3, and this edge 5 is then secured by suitable means in a fixed position in accordance with the diameter of the larger pipe to be produced. This edge 5 is then located, for example, in the position 5'. It is evident that, if plate 3 is located in the position 3', a pipe may be produced which has twice the diameter of a pipe which may be produced by plate 3 when its edges 4 and 5 lie within the same perpendicular plane. Plate 3' then covers one fourth of the peripheral area of a cylinder, the axis of which is located at 6'. The means for guiding the edge 5 are indicated diagrammatically by the dotted line connecting the points 5 and 5'.

The same results occur if the positions of the forming tool and strip 1 relative to each other are reversed and strip 1 is fed from the bottom toward the top of plate 3, as illustrated in FIGURE 2. The upper edge of plate 3 then lies at 4 in the position for producing a pipe of the minimum diameter and at 4' in the position for producing a pipe of the maximum diameter. The means for guiding the edge 4 are indicated in FIGURE 2 by the dotted line connecting the points 4 and 4'.

From FIGURE 3 it may be seen that it is not necessary to shift merely the outlet edge 5 or 4 of plate 3, as shown in FIGURES 1 and 2, respectively, but it is also possible to shift both edges of plate 3 as indicated by the positions of adjustment 4" and 5". By also shifting the inlet edge 5, it is possible to vary the distance of this edge from the end of the guide channel 2 and the angle of engagement of strip 1 on the curved surface of plate 3. When plate 3 is bent to the position 3", it covers one fourth of the peripheral area of a cylinder, the axis of which is located at 6".

In the three embodiments of the invention as illustrated it is assumed that strip 1 which is to be molded into a helical shape so as to form a helical seam pipe is fed along a horizontal plane toward the plate-shaped molding tool 3. Obviously, if plate 3, 3', or 3" is turned accordingly it is also possible to feed the strip 1 in a perpendicular or any other plane, for example, in an inclined plane, toward the forming tool.

If the strips 1 which are to be molded into helical seam pipes have a considerable thickness and/or a considerable solidity, it is advisable and easily possible to provide suitable stabilizing or reinforcing means to support the plate-shaped forming tool on the outer side thereof.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. An apparatus for producing helical seam pipes of different diameters from flat metal strip material, comprising a forming tool consisting of an elastically deformable plate adapted to be bent to different concave shapes and having substantially parallel inlet and outlet edges, feeding means for feeding a flat metal strip toward and against said concave plate near said inlet edge thereof in a direction at an angle differing from a right angle to the surface of said plate and then along said plate toward and beyond said outlet edge, whereby said strip is bent on the concave surface of said plate continuously into a helical shape, said forming tool and said feeding means being adjustable relative to each other to vary said angle, said apparatus further comprising means for guiding at least one of said edges of said plate to different points between one position in which said plate is bent so as to have a minimum radius of curvature and a maximum sector angle limited by said inlet and outlet edges and another position in which said plate is bent so as to have a maximum radius and a minimum sector angle between said edges, and means for securing at least one of said edges in the adjusted positions at said points.

2. An apparatus for producing helical seam pipes of different diameters from flat metal strip material, comprising a forming tool consisting of an elastically deformable plate adapted to be bent to different concave shapes and having substantially parallel inlet and outlet edges, feeding means for feeding a flat metal strip toward and against said concave plate near said inlet edge thereof in a direction at an angle differing from a right angle to the surface of said plate and then along said plate toward and beyond said outlet edge, whereby said strip is bent on the concave surface of said plate continuously into a helical shape, said forming tool and said feeding means being adjustable relative to each other to vary said angle, said apparatus further comprising means for guiding at least one of said edges of said plate to different points between one position in which said plate is bent so as to have a minimum radius of curvature and a maximum sector angle limited by said inlet and outlet edges and another position in which said plate is bent so as to have a maximum radius and a minimum sector angle between said edges, all centers of curvature of said plate being located substantially within a plane connecting said inlet and outlet edges, and means for securing at least one of said edges in the adjusted positions at said points.

3. An apparatus for producing helical seam pipes of different diameters from flat metal strip material, comprising a forming tool consisting of an elastically deformable plate adapted to be bent to different concave shapes and having substantially parallel inlet and outlet edges, feeding means for feeding a flat metal strip toward and against said concave plate near said inlet edge thereof in a direction at an angle differing from a right angle to the surface of said plate and then along said plate toward and beyond said outlet edge, whereby said strip is bent on the concave surface of said plate continuously into a helical shape, said forming tool and said feeding means being adjustable relative to each other to vary said angle, said apparatus further comprising means for guiding at least one of said edges of said plate to different points between one position in which said plate is bent so as to have a minimum radius of curvature and a maximum sector angle of 180° limited by said inlet and outlet edges and another position in which said plate is bent so as to have a maximum radius and a minimum sector angle between said edges of 90°, and means for securing at least one of said edges in the adjusted positions at said points.

4. An apparatus as defined in claim 1, further comprising means for holding said inlet edge of said plate in a fixed position, said guiding means acting upon said outlet edge of said plate and adapted to move said outlet edge substantially in the same general direction in which said strip is fed toward said inlet edge, said securing means being adapted to lock said guiding means and said outlet edge in the adjusted positions at said points.

References Cited by the Examiner

UNITED STATES PATENTS

| | | | |
|---|---|---|---|
| 642,339 | 1/1900 | Krummel | 72—140 |
| 2,006,389 | 7/1935 | Fuchs | 72—140 |
| 2,389,109 | 11/1945 | Weisberger et al. | 72—145 |
| 2,393,804 | 1/1946 | Nigro | 72—138 |
| 2,991,740 | 7/1961 | Eckhardt | 72—135 |
| 3,139,850 | 7/1964 | Weigel | 72—135 |
| 3,145,760 | 8/1964 | Brautigam | 72—138 |
| 3,195,338 | 7/1965 | Bram | 72—145 |

FOREIGN PATENTS 1,231,703  4/1960  France.

CHARLES W. LANHAM, *Primary Examiner.*

W. H. JUST, E. M. COMBS, *Assistant Examiners.*